Oct. 18, 1932.    F. L. BAMFORD    1,883,466

COMBINED TAIL LIGHT, STOP LIGHT, AND BACKING LIGHT FOR MOTOR VEHICLES

Filed Sept. 24, 1928

Inventor
Frank L. Bamford

Patented Oct. 18, 1932

1,883,466

UNITED STATES PATENT OFFICE

FRANK L. BAMFORD, OF DETROIT, MICHIGAN, ASSIGNOR TO C. M. HALL LAMP COMPANY, OF DETROIT, MICHIGAN, A CORPORATION OF MICHIGAN

COMBINED TAIL-LIGHT, STOP LIGHT, AND BACKING LIGHT FOR MOTOR VEHICLES

Application filed September 24, 1928. Serial No. 307,965.

In the present state of the art of rear light construction for automobiles, it is quite usual to combine in a single casing a tail light and a stop light for use on motor vehicles. In some instances a third or backing light has also been combined with the tail light and stop light, each of said lights being arranged in a separate compartment of the casing and having its individual reflector and lens. It is the object of the present invention to combine the three lights in a single unit which is no larger than that required for the two lights, thereby reducing the cost of manufacture and of shipment, obtaining a more pleasing appearance and simplifying the construction.

With this object in view, my invention consists in the novel construction as hereinafter set forth.

Figures 1, 2, 3:
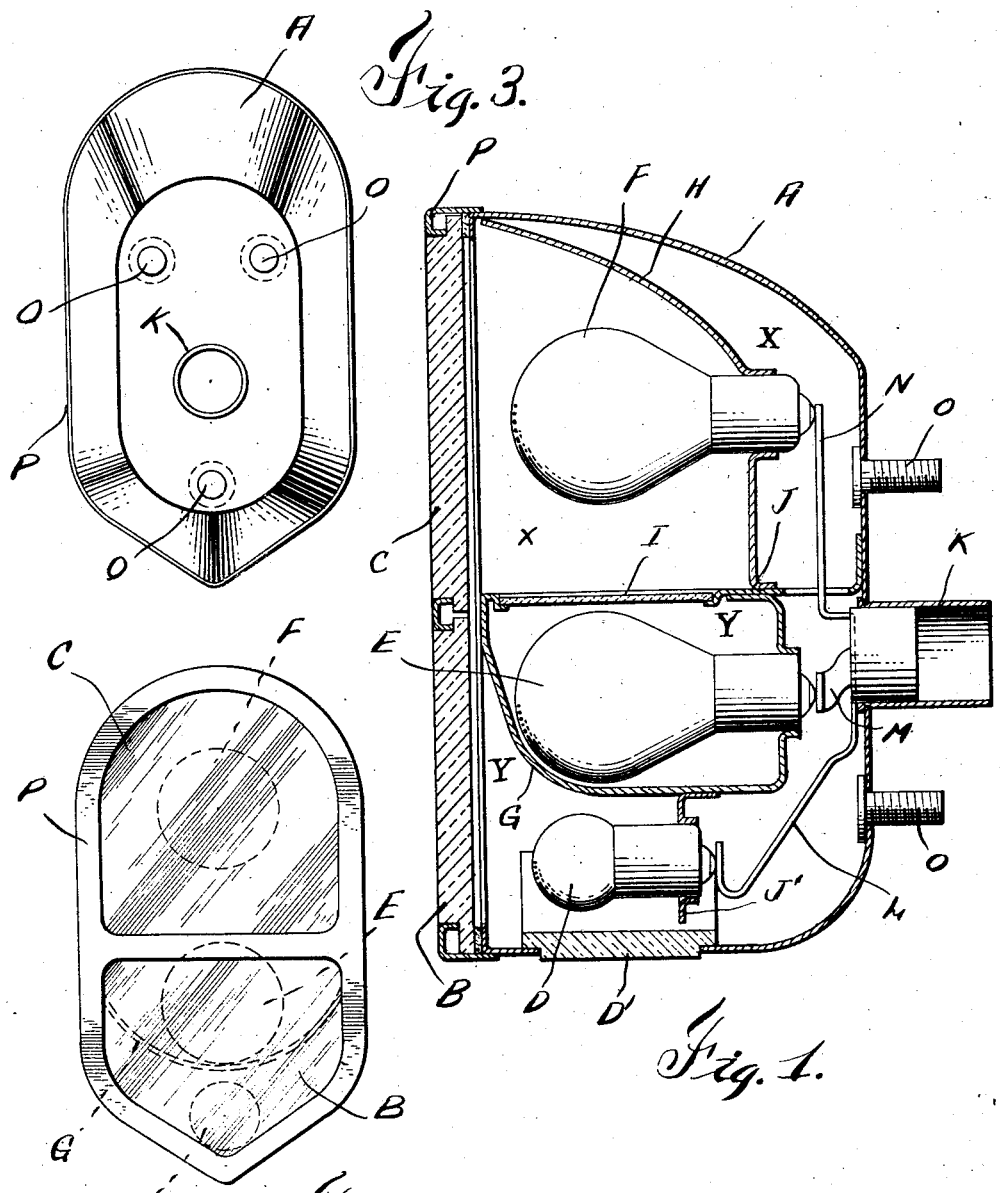
Figure 1 is a vertical central section.
Figure 2 is a front elevation thereof.
Figure 3 is a rear elevation thereof.

A is the outer casing of the lamp which may be of any desired shape or design, but which is provided with only two rearwardly facing light openings. The lower one of these light openings is for the tail light and is provided with the usual red glass B. The upper opening is preferably provided with a transparent panel C or if a color is used, one which will have the least effect in diminishing the intensity of the light passing therethrough. D, E and F are three separate lamp bulbs respectively used for the tail light, stop light and backing light. The bulbs D and E are both arranged in a portion of the case that is in rear of the glass B, but the bulb E is shielded against the passage of light through said glass by a reflector G which will direct the rays upward or into the portion of the casing in rear of the transparent panel C. Within this portion of the casing is a concave reflector H so arranged as to direct the rays from the bulb E outward through the panel C. The bulb F is arranged in front of the reflector H and therefore its rays also may be directed outward through the panel C. To differentiate the stop light rays from the backing light, a filter is arranged intermediate the bulb E and the reflector H. This, as shown, is the glass I of any desired color which is mounted in a partition J that separates the casing into compartments X and Y respectively in rear of the glass B and glass C.

The socket for the bulb F is in the reflector H; the socket for the bulb E is in the reflector G; and the latter is suspended from the partition J. The socket for the bulb D is in a bracket J' depending from the reflector G. This bulb D is located sufficiently forward in the casing so that its rays which pass out through the panel B will not be obstructed by the reflector G. There is also the usual transparent panel D' beneath the bulb D through which the light passes to the license plate.

The rear of the casing is provided with a socket K for the connector plug as shown and from the socket the contacts L, M and N lead respectively to the bulbs D, E and F. The casing A may be mounted upon any suitable supporting bracket or by any suitable clamping means such as the screws O. Also the glass panels B and C are mounted in a suitable frame P detachably engaging the casing and of any suitable construction.

In use the bulb E may be controlled by a switch operated by the brake pedal as is usual for stop lights, and the switch for the bulb F may be controlled by the gear shift lever so as to be illuminated whenever this is thrown into reverse. Thus the light from each of the bulbs E and F passes outward through the same panel C but alternatively, because of their respective controls. Thus without increasing the size of the casing over that required for the stop light and tail light combination I have added the third light for backing.

What I claim as my invention is:

1. A lamp comprising a casing provided with adjacent light openings, lamp bulbs arranged opposite the respective openings for delivering the light therethrough, a third lamp bulb arranged in rear of one of said openings, means for preventing the light from the third bulb from shining through the opening in front thereof, including a reflector for directing a portion of the light from the third bulb transversely into the space opposite the other of said openings, a reflector for redirecting said light through the latter opening and a filter arranged between said third light and said last mentioned reflector for changing the character of light delivered therefrom.

2. A lamp comprising a casing having adjacent light openings, lamp bulbs arranged opposite the respective openings for delivering light directly therethrough, a third bulb arranged opposite one of said openings, a reflector below and in front of the third bulb preventing delivery of light from said third bulb through the last mentioned opening and directing light rays from said third bulb to a point in rear of the other of said openings, and a reflector above and in rear of one of the first mentioned bulbs for redirecting the last mentioned light rays through the other of said openings, said lamp also including means for coloring the light reflected from the third bulb.

3. In a lamp, a casing having a transverse partition and light openings upon opposite sides of said partition, two light bulbs in said casing in rear of one of said openings, a color filter in said partition, means for preventing the light from one of said bulbs from shining through the opening in front thereof including a reflector suspended from said partition, and causing a portion of the rays of light from said last mentioned bulb to be projected through said filter, a lamp bulb upon the other side of said partition, and a reflector projecting from the other side of said partition, and serving to direct rays of light from said last mentioned bulb in a predetermined direction, and also serving to direct in a predetermined direction the rays of light that have been projected through the filter aforesaid by the first mentioned reflector.

In testimony whereof I affix my signature.

FRANK L. BAMFORD.